United States Patent
Ooshima

(10) Patent No.: US 8,886,815 B2
(45) Date of Patent: Nov. 11, 2014

(54) COMMUNICATION APPARATUS, TIMER CONTROL APPARATUS, AND TIMER CONTROL METHOD

(75) Inventor: Hiroyoshi Ooshima, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 469 days.

(21) Appl. No.: 12/329,909

(22) Filed: Dec. 8, 2008

(65) Prior Publication Data

US 2009/0164651 A1 Jun. 25, 2009

(30) Foreign Application Priority Data

Dec. 19, 2007 (JP) .................................. 2007-327991

(51) Int. Cl.
- *G06F 15/16* (2006.01)
- *H04L 29/06* (2006.01)
- *H04N 21/43* (2011.01)

(52) U.S. Cl.
CPC ............... *G06F 15/16* (2013.01); *H04L 69/28* (2013.01); *H04N 21/4305* (2013.01)
USPC .......................................... 709/228; 709/227

(58) Field of Classification Search
USPC ........................................................ 709/228
See application file for complete search history.

(56) References Cited

U.S. PATENT DOCUMENTS

| | | | | |
|---|---|---|---|---|
| 5,577,237 | A * | 11/1996 | Lin | 713/500 |
| 6,182,133 | B1 * | 1/2001 | Horvitz | 709/223 |
| 6,957,311 | B2 * | 10/2005 | Kanamaru et al. | 711/158 |
| 7,240,090 | B2 * | 7/2007 | Purdy | 709/203 |
| 7,552,446 | B1 * | 6/2009 | Sosnovsky et al. | 719/318 |
| 2001/0028651 | A1 * | 10/2001 | Murase | 370/392 |
| 2004/0240388 | A1 * | 12/2004 | Albion et al. | 370/252 |
| 2005/0198007 | A1 * | 9/2005 | Ossman | 707/3 |
| 2005/0209804 | A1 * | 9/2005 | Basso et al. | 702/79 |
| 2008/0031267 | A1 | 2/2008 | Imao | 370/401 |
| 2008/0140977 | A1 | 6/2008 | Shimakura et al. | 711/169 |

* cited by examiner

*Primary Examiner* — Rupal Dharia
*Assistant Examiner* — Joe Chacko
(74) *Attorney, Agent, or Firm* — Fitzpatrick, Cella, Harper & Scinto

(57) ABSTRACT

A communication apparatus comprises a processor, a memory configured to store timer information, a cache configured to store timer information, and a timer controller configured to store timer information regarding an established connection in the cache. The timer controller notifies the processor of a time-out of the timer information stored in the cache and a time-out of the timer information stored in the memory.

23 Claims, 9 Drawing Sheets

COMMUNICATION APPARATUS, TIMER CONTROL APPARATUS, AND TIMER CONTROL METHOD

BACKGROUND OF THE INVENTION

1. Field of the Invention

The present invention relates to a communication apparatus, a timer control apparatus, and a timer control method.

2. Description of the Related Art

Network timer management has conventionally been performed as part of network protocol processing. In network timer management, plural types of timers, for example, an ACK timer, a continuous timer or the like, are the target of management for each established connection. The management-target timer is started by a processor, for example, a CPU, at necessary timing in the network protocol processing. When the management-target timer times out, predetermined processing is performed in accordance with the connection and the type of timer. If a predetermined event occurs before the time-out and the timer becomes unnecessary, stop processing is performed with respect to the timer. An example of implementing the aforementioned network timer control is seen in the timer management technique using software (U.S. Pat. No. 5,577,237).

According to the recently adopted timer management method, part of the network timer processing that should be performed by a processor is performed by hardware in place of the processor. According to this method, hardware performs the following two processing. More specifically, two processing executed by hardware are:

(1) registration, revision, and deletion of timer information in a storage device in a case where the timer is started or stopped; and (2) confirmation of whether or not the timer in operation has been timed out in a case where an interruption occurs in a cycle timer.

Hereinafter, the hardware apparatus which executes the aforementioned processing (1) and (2) in place of a processor will be referred to as a network timer management apparatus.

The network timer management apparatus performs the aforementioned processing (1) in a case where a processor makes a timer-start or timer-stop request. More specifically, it is executed in the following manner. First, the processor makes a timer-start request along with information regarding the connection type, timer type, time-out time and the like, to the network timer management apparatus. The network management apparatus which has received the timer-start request registers the timer information in a storage device, and sets a start-up flag indicating that the timer has been started (revision). Meanwhile, in a case where the processor makes a timer-stop request to the network timer management apparatus, timer information of the target timer is searched in the storage device, and the corresponding start-up flag is invalidated (revision) or deleted.

The network timer management apparatus performs the aforementioned processing (2) in a case where it receives an interrupt notification from a cycle timer. More specifically, it is executed in the following manner. When a notification is received from the cycle timer, the network timer management apparatus reads timer information in the storage device and determines whether or not there is a timer in which a start-up flag has been set and the set time has run out. If such timer is detected, the network timer management apparatus sends an interrupt signal to the processor to notify the time-out.

In the above-described network timer management apparatus, the storage device where timer information is stored is generally a shared memory of the processor and the network timer management apparatus. Therefore, depending on the amount of accesses to the shared memory, system bus competition and access competition to the shared memory occur, raising concerns about reduced performance of the entire system. There is also a concern that increased memory accesses cause increased power consumption.

SUMMARY OF THE INVENTION

The object of the present invention is to efficiently manage timer information regarding a connection.

Furthermore, another object of the present invention is to realize cache control which is appropriate for managing timer information regarding a connection.

Another object of the present invention is to provide a communication apparatus comprising: a first control unit; a memory configured to store timer information; a cache configured to store timer information; and a second control unit configured to store timer information regarding an established connection in the cache, wherein the second control unit notifies the first control unit of a time-out of the timer information stored in the cache and a time-out of the timer information stored in the memory.

Another object of the present invention is to provide a timer control apparatus for controlling a cache in which timer information is stored, comprising: a control unit configured to store timer information regarding an established connection in a memory or in the cache; and a notification unit configured to notify a processor of a time-out of timer information stored in the memory and a time-out of timer information stored in the cache.

Another object of the present invention is to provide a timer control method of a timer control apparatus, comprising the steps of: storing timer information regarding an established connection in a memory or a cache; and notifying a processor of a time-out of timer information stored in the memory and a time-out of timer information stored in the cache.

Further features of the present invention will become apparent from the following description of exemplary embodiments with reference to the attached drawings.

DESCRIPTION OF THE EMBODIMENT

Hereinafter, a preferred embodiment of the present invention will be described in detail with reference to the accompanying drawings.

Figure 1:
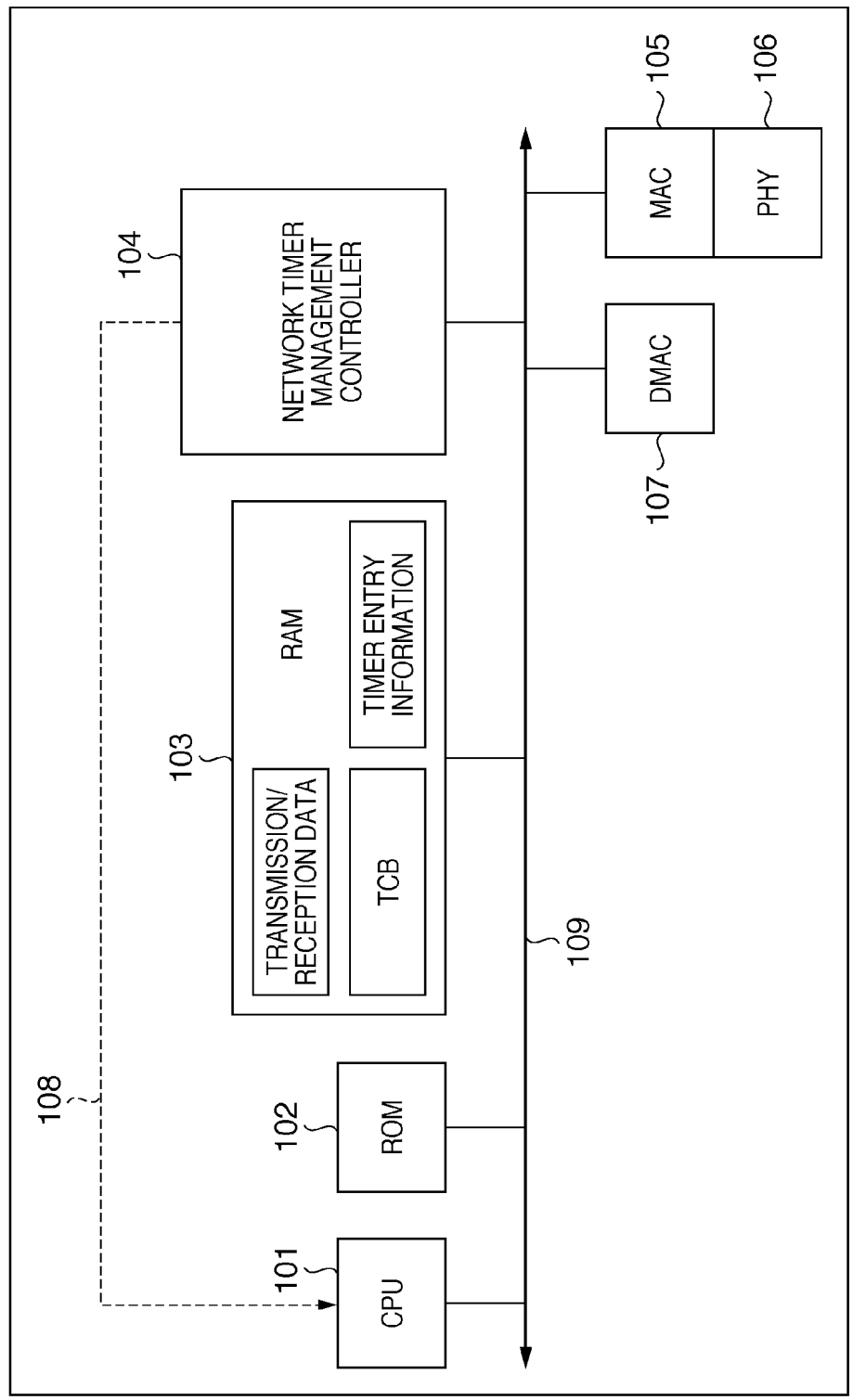
FIG. 1 is a block diagram showing, as an example, a configuration of a network protocol processing system according to an embodiment of the present invention.

FIG. 1 is a block diagram showing, as an example, a configuration of a TCP/IP network protocol processing system according to the present embodiment. In FIG. 1, a CPU 101 executes TCP/IP network protocol processing using software. ROM 102 stores software for various processing executed by the CPU 101. RAM 103 (e.g., dynamic RAM (DRAM)) is used as an execution work area of the CPU 101. Also, the RAM 103 stores various data necessary for executing TCP/IP network protocol processing. Such data includes data transmitted or received in TCP/IP network communication, a transmission control block (TCB), and network timer management data. Note that the TCB has a widely known data structure for storing information (connection information) indicative of a connection status that has currently been established. Hereinafter, "network timer management data" will be referred to as timer entry information. Details of the timer entry information are described with reference to FIG. 2.

A network timer management controller 104 executes part of the network timer processing that is supposed to be executed by the processor (CPU 101). In other words, the network timer management controller 104 serves as a network timer management apparatus which manages the timer used in the network communication formed by the processor. Numeral 108 denotes an interrupt signal to the CPU 101 which is generated by the network timer management controller 104. Numeral 105 denotes a media access controller (MAC), and 106 denotes a physical layer (PHY) which performs TCP/IP network communication control. A direct memory access controller (DMAC) 107 controls transfer of the data between the RAM 103 and the MAC 105 which is transmitted or received in TCP/IP network communication. A bus 109 interconnects the CPU 101, ROM 102, RAM 103, network timer management controller 104, MAC 105, and DMAC 107.

Note that, for instance, the network timer management controller 104, MAC 105, PHY 106, and DMAC 107 may constitute a so-called network interface board. In this case, such network interface board is mounted on a processor having the CPU 101, ROM 102, RAM 103, and bus 109 for realizing network communication and executing part of the network timer management that is supposed to be executed by the processor.

Figure 2:
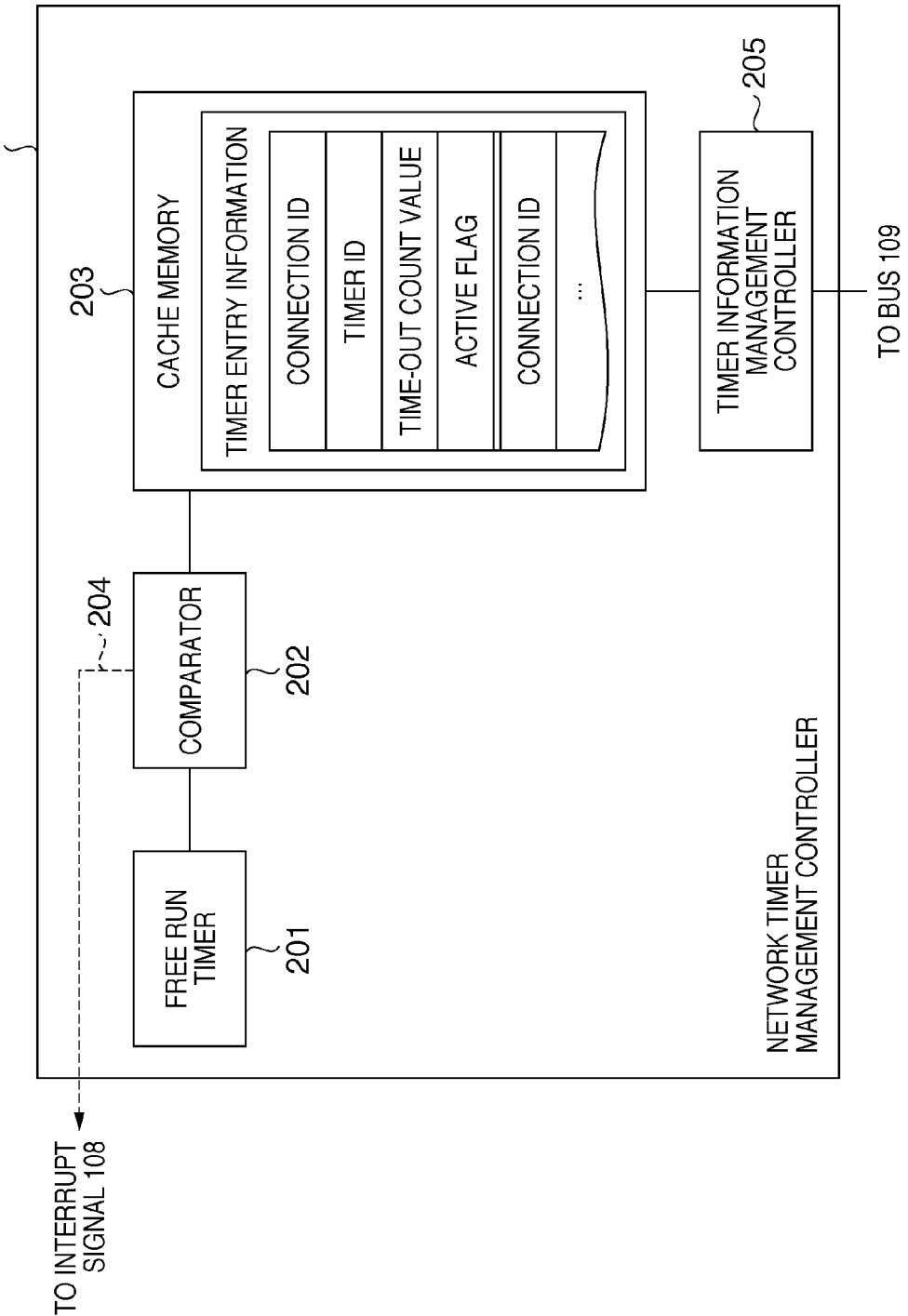
FIG. 2 is a block diagram showing, as an example, a configuration of a network timer management controller according to the embodiment of the present invention.

FIG. 2 is a block diagram showing, as an example, a configuration of the network timer management controller 104. In FIG. 2, a free run timer 201 notifies a comparator 202 of a timing signal at every predetermined cycle. Note that although the present embodiment has the free run timer 201 as the constituent element of the network timer management controller 104, the free run timer may be provided outside the network timer management controller 104. A comparator 202 subtracts the time-out count in the timer entry information stored in the cache memory 203 in response to the notification from the free run timer 201, and determines whether or not the time has run out by comparing the subtraction result with 0 (details will be described later). When the comparator 202 determines that there is a timer in which the time has run out, it activates an interrupt signal 204 and notifies the processor (CPU 101) of the timer in which the time has run out. The interrupt signal 204 connects directly to the interrupt signal 108 shown in FIG. 1.

A cache memory 203 provides the comparator 202 with timer entry information. A timer information management controller 205, which comprises an access interface to the bus 109, has an access for the timer entry information and TCB stored in the RAM 103 through the access interface. The timer information management controller 205 caches timer entry information in the cache memory 203 as necessary. As described above, the timer information management controller 205 caches, for each timer, timer information (timer entry information) which includes the count value up to the time-out (time-out count value) in the cache memory 203. In accordance with a signal from the free run timer 201, the comparator 202 determines for each timer the time-out using the timer information (timer entry information) cached in the cache memory 203.

The network timer management controller 104 starts timer management and cache management, which will be described later, when it receives a timer management start request from the CPU 101. The timer management and cache management are continued until a timer management stop request is received from the CPU 101. When the network timer management controller 104 starts the timer management, it registers the timer, in which the timer start request is received from the CPU 101, and makes a time-out notification to the CPU 101 when the timer times out. Meanwhile, when a timer stop request is received from the CPU 101, the network timer management controller 104 performs stop processing of the timer. Hereinafter, a configuration of the timer entry information controlled by the network timer management controller 104 is described. Also described are the timer start processing executed in a case where a timer start request is received, the timer stop processing executed in a case where a timer stop request is received, and the continuously performed timer management by the network timer management controller 104.

As shown in FIG. 2, the timer entry information includes the following:

- connection ID indicative of a connection related to the timer;
- timer ID indicative of the type of timer, for example, an ACK timer, a continuous timer or the like, in the TCP/IP network timer;
- time-out count value indicative of a count value up to the time-out of the timer; and
- active flag indicative of whether or not the timer is valid.

The time-out count value is decremented by 1 at every cycle of the free run timer 201 (at every clock input). The time-out count value 0 indicates that the timer has timed out. The time-out count value, which is a count value of the processing cycle of the free run timer 201, is calculated by the CPU 101 based on the actual time-out time. For instance, assuming that the free run timer 201 is operating at 1 MHz, the time-out time of 10 milliseconds (ms) is calculated as 10,000 counts. Further, in a case where an active flag is not set, the time-out count value is not decremented; thus, the timer's time-out does not occur.

Figure 3:
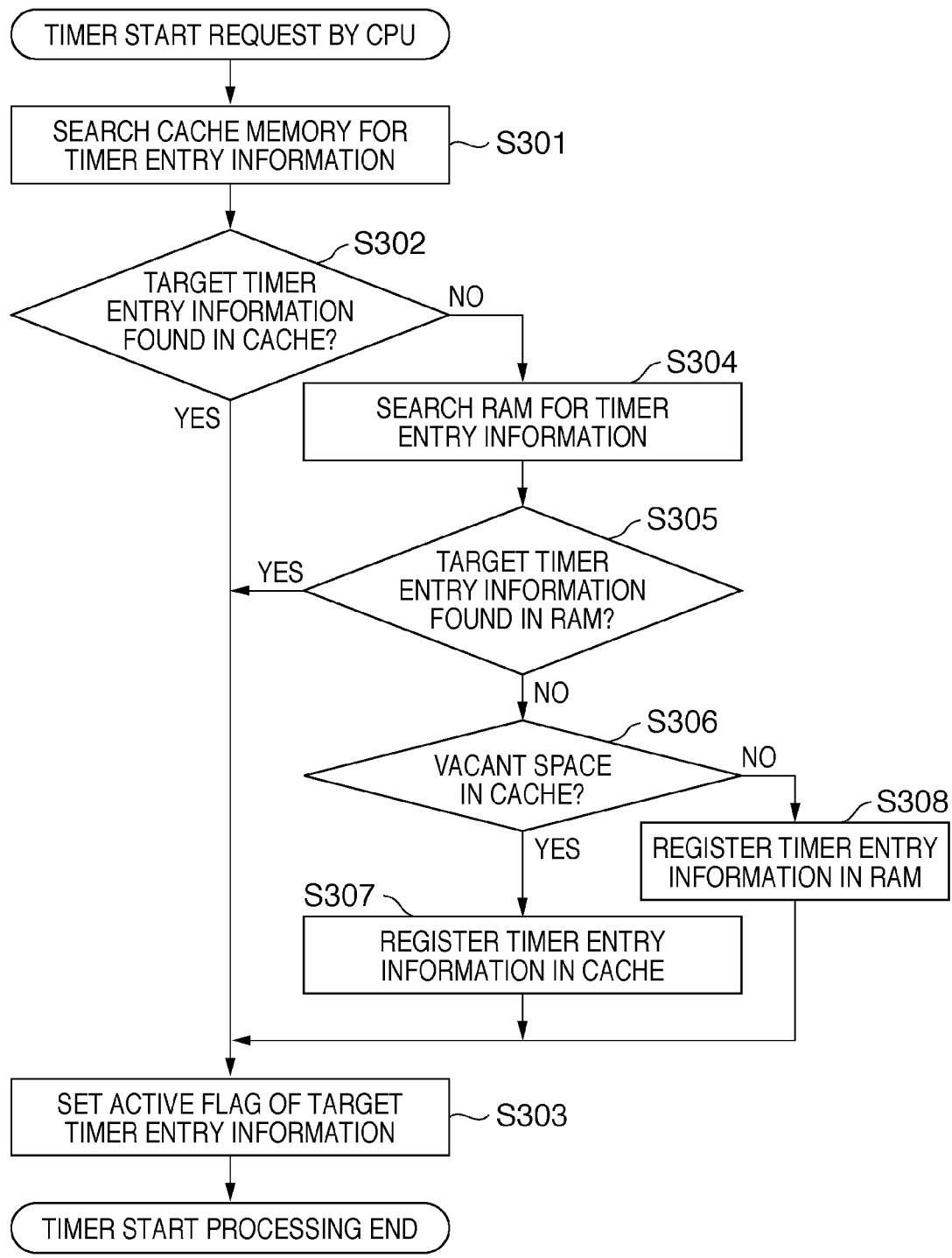
FIG. 3 is a flowchart describing timer start processing according to the embodiment of the present invention.

FIG. 3 is a flowchart describing timer start processing performed by the network timer management controller 104. The network timer management controller 104 starts the timer start processing when it receives a timer start request from the CPU 101. In step S301, the timer information management controller 205 searches the cache memory 203 for determining whether or not timer entry information of the timer (will be referred to as a start request timer), which is designated by the received timer start request, has already been registered in the cache memory 203. More specifically, the CPU 101 designates the timer to be started, that is, the start request timer, by using a connection ID and a timer ID. The timer information management controller 205 searches the cache memory 203 for timer entry information having a matched connection ID and timer ID of the start request timer. As a result of the search, if timer entry information of the start request timer is found in the cache memory 203, the control proceeds from step S302 to S303. In step S303, the timer information management controller 205 sets (validates) the active flag of the timer entry information.

Meanwhile, if it is determined in step S302 that timer entry information of the start request timer is not found in the cache memory 203, the control proceeds from step S302 to S304. In step S304, the timer information management controller 205 searches the RAM 103 for determining whether or not timer entry information of the start request timer has been registered. As a result of the search, if timer entry information of the start request timer is found in the RAM 103, the control proceeds from step S305 to S303 where the active flag of the timer entry information is set (validated) as described above. Note, in this case, the active flag of the timer entry information in the RAM 103 is set.

If timer entry information of the start request timer is not found in the RAM 103 in step S305, the control proceeds to step S306. In step S306, the timer information management controller 205 determines whether or not there is vacant space in the cache memory 203. In a case where there is vacant space in the cache memory 203, the timer information management controller 205 stores the timer entry information of the registering timer (shown in FIG. 2) in the cache memory 203 in step S307. Meanwhile, if the cache memory 203 does not have vacant space, the timer information management controller 205 stores the timer entry information of the registering timer in the RAM 103 in step S308. In either case of registering the timer entry information in the cache memory 203 or RAM 103, the active flag of the timer entry information is set (validated) in step S303, and the timer start processing is completed.

Note, in a case where the target timer entry information is found in the RAM 103 in step S305 and there is vacant space in the cache memory 203, the control may be configured so as to load the target timer entry information to the cache memory 203. In this case, an active flag of the timer entry information is set in the cache memory 203 in step S303.

Figure 4:
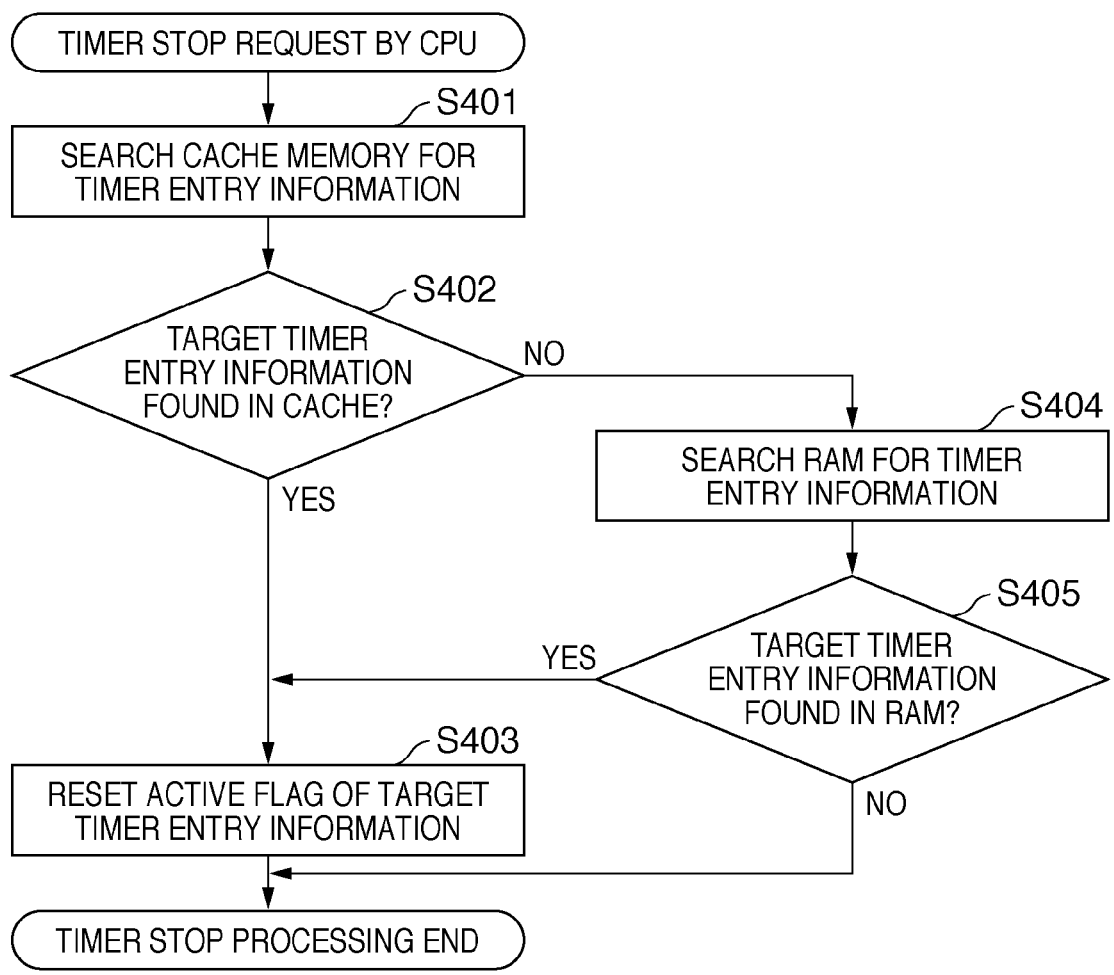
FIG. 4 is a flowchart describing timer stop processing according to the embodiment of the present invention.

Next, timer stop processing performed by the network timer management controller 104 is described. FIG. 4 is a flowchart describing timer stop processing. The network timer management controller 104 starts the timer stop processing when it receives a timer stop request from the CPU 101. In step S401, the timer information management controller 205 searches the cache memory 203 for determining whether or not timer entry information of the timer (will be referred to as a stop request timer), which is designated by the received timer stop request, is included in the cache memory 203. More specifically, the CPU 101 designates the timer to be stopped, that is, the stop request timer, by using a connection ID and a timer ID. The timer information management controller 205 searches the cache memory 203 for timer entry information having a matched connection ID and timer ID of the stop request timer. As a result of the search, if timer entry information of the stop request timer is found in the cache memory 203, the control proceeds from step S402 to S403. In step S403, the timer information management controller 205 resets (invalidates) the active flag of the timer entry information.

Meanwhile, if it is determined in step S402 that timer entry information of the stop request timer is not found in the cache memory 203, the control proceeds from step S402 to S404. In step S404, the timer information management controller 205 searches the RAM 103 for determining whether or not timer entry information of the stop request timer is included in the RAM 103. As a result of the search, if timer entry information of the stop request timer is found in the RAM 103, the control proceeds from step S405 to S403 where the active flag of the timer entry information is reset (invalidated). If the timer entry information is not found in the RAM 103, the stop processing ends since there is no timer to be stopped.

In a case where it is determined that timer entry information of the stop request timer is found in the cache memory 203, the timer entry information in which the active flag is reset in step S403 may be flushed from the cache memory 203 and sent off to the RAM 103. By this control, the usage efficiency of the cache memory 203 can be improved. However, in a case where a request is made to reuse the timer entry information that has been sent off to the RAM 103 (a timer start request is made by the CPU 101), the timer information management controller 205 must access the RAM 103, and it may reduce the usage efficiency. Note, in cache control, terms "flush" and "clean" are used in the procedure of sending off cache data from the cache. In general, "flush" means cache data discarding (deleting cache data or releasing the corresponding area) and writing back the data, while "clean" simply means cache data discarding. In both cases of "flush" and "clean", cache data is "discarded" from the cache memory. Therefore, the specification of the present invention will use "flush" as a collective term of flush and clean.

Figure 5:
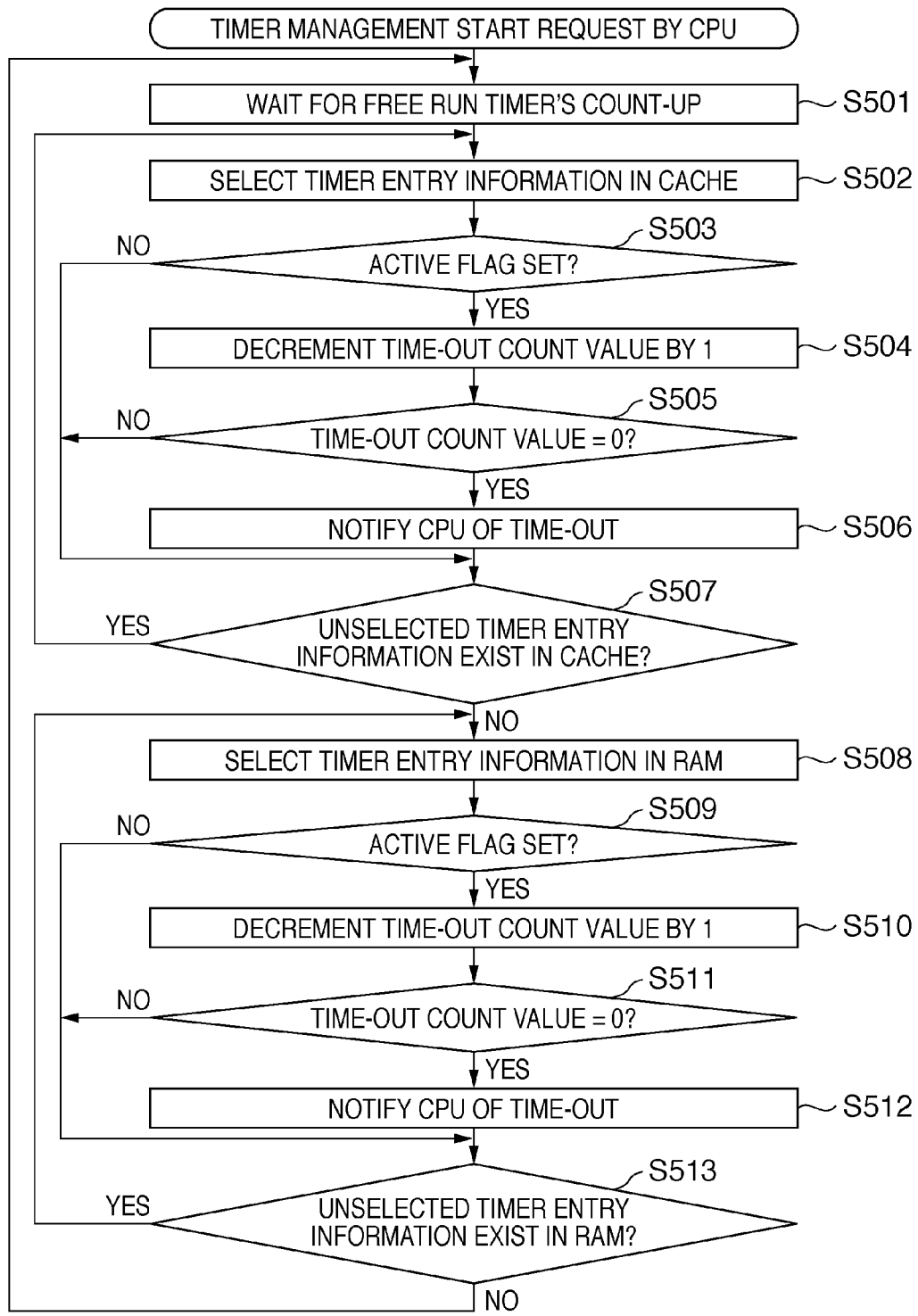
FIG. 5 is a flowchart describing timer management processing according to the embodiment of the present invention.

Described next is timer management performed by the network timer management controller 104. FIG. 5 is a flowchart describing timer management processing performed by the network timer management controller 104. The network timer management controller 104 starts the timer management processing from step S501 when it receives a timer management start request from the CPU 101.

When a timer management start request is received, the timer information management controller 205 makes the comparator 202 start the timer management. The comparator 202, which has received the timer management start request, waits for a count-up of the free run timer 201 in step S501. When the free run timer 201 counts up, steps S502 to S513 are executed before the next count-up. Steps S501 to S513 are repeatedly performed each time the free run timer 201 counts up. Hereinafter, processing from steps S502 to S513 is described.

In step S502, one of the timer entry information in the cache memory 203 is selected. In step S503, the comparator 202 determines whether or not the active flag of the timer entry information that has been selected in step S502 is set. When the active flag is set, the control proceeds from step S503 to S504. In step S504, the comparator 202 decrements by 1 the time-out count value of the timer entry information which has been selected in step S502. In step S505, the comparator 202 determines whether or not the time-out count value has become 0 as a result of subtraction. When the time-out count value has become 0, the control proceeds to step S506, where the comparator 202 performs time-out notification to the CPU 101 using the interrupt signal 108.

When time-out notification is performed in step S506, or when the time-out count value is not 0 in step S505, or when the active flag is not set in step S503, the control proceeds to step S507. In step S507, the comparator 202 determines whether or not there is timer entry information which has not been selected in the cache memory 203. If there is, the control returns to step S502, and the above-described processing is repeated on the unselected timer entry information. If it is determined in step S507 that there is no unselected timer entry information in the cache memory 203, the control proceeds to step S508. In steps S508 to S513, processing similar to steps S502 to S507 is performed on the timer entry information in the RAM 103.

If a timer management end request is received from the CPU 101 during the above-described timer management processing, the timer information management controller 205 ends the timer management processing which is executed by the comparator 202 even if the control is in progress. In a case where the timer management processing once ends, no processing is performed until a next timer management start request is received. When a timer management start request is received, the timer information management controller 205 makes the comparator 202 start the processing again from step S501.

According to the above-described timer management processing, timer start processing, and timer stop processing which are executed by the network timer management controller 104, the CPU 101, which has made a timer start request, can receive an interrupt notification of the timer's time-out. Furthermore, by making a timer stop request before the time-out, the CPU 101 can exclude the stop request timer from the timer management target. Meanwhile, the timer entry information which has once been registered is controlled under the network timer management controller 104 (in the cache memory 203 or the RAM 103). Therefore, the information can be reused when a timer start request of the same timer is made. If the timer entry information to be reused is found in the cache memory 203, not only the timer start processing can be performed at high speed, but also an access to the RAM 103 can be suppressed.

Next described is cache management by the timer information management controller 205. Cache management starts when a timer management start request is received from the CPU 101 as similar to the above-described timer management, and continues until a timer management stop request is received. In the cache management, cache control processing which will be described later is repeatedly performed based on a content of the TCB stored in the RAM 103. A TCB is a data block used in TCP/IP network protocol processing, and stores information indicative of a connection established in the network communication. When a new connection is established, information on the connection is added to the TCB. When a predetermined connection is cut off, information on the connection is deleted from the TCB. When a status of connection is changed, information on the connection in the TCB is corrected.

Since cache control processing which is repeatedly performed in cache management is executed based on a content of the TCB, it is preferable that the cache control processing be performed at the time of changing the TCB. Therefore, in the present embodiment, the CPU 101 makes a cache control request to the network timer management controller 104 when the TCB is changed. The network timer management controller 104 performs cache control processing which will be described later when it receives the cache control request. However, it should be noted that issuance of cache control request by the CPU 101 may cause an increased processing load of the CPU 101 or changes in existing software. To avoid this, the control may be configured in a way that the network timer management controller 104 periodically performs cache control processing with the use of, for example, an internal free run timer 201. In this case, a cache control request is automatically generated inside the network timer management controller 104.

Described hereinafter is cache control processing which is performed by the network timer management controller 104 when it receives a cache control request. Cache control processing is divided into three main processing: cache lock processing, cache flush processing, and cache preload processing. Hereinafter, overall processing of cache control is described with reference to FIG. 6. Furthermore, cache lock processing, cache flush processing, and cache preload processing are described with reference to FIGS. 7 to 9.

Figure 6:
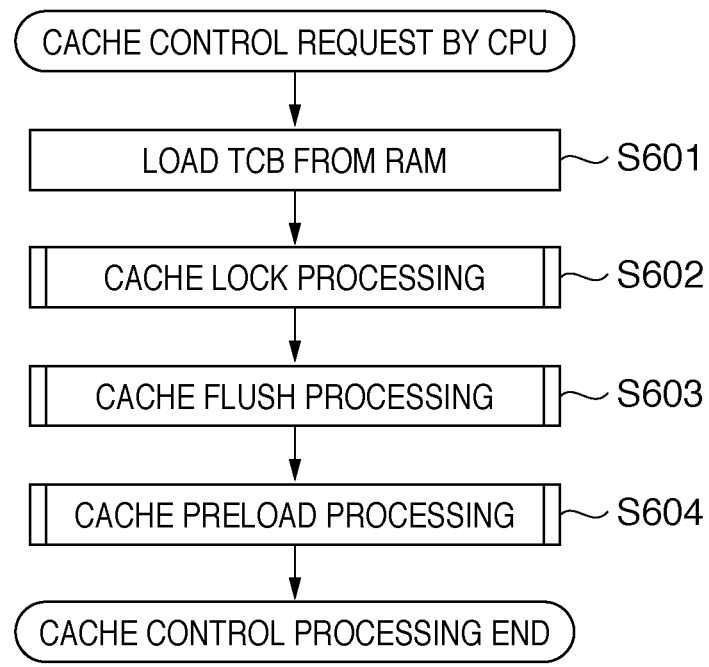
FIG. 6 is a flowchart describing cache control processing according to the embodiment of the present invention.

FIG. 6 is a flowchart describing cache control processing performed by the network timer management controller 104. The network timer management controller 104 starts cache control processing when it receives a cache control request.

In step S601, the timer information management controller 205 reads (load) a TCB from the RAM 103. A TCB is connection information indicative of a connection established in the network communication. The entire TCB which is loaded is stored in, for example, a register or cache (not shown) of the timer information management controller 205. Thereafter, the timer information management controller 205 performs cache lock processing in step S602, cache flush processing in step S603, and cache preload processing in step S604, then ends the cache control processing once. Thereafter, until a timer management end request is received from the CPU 101, the timer information management controller 205 repeatedly performs processing from steps S601 to S604 for each cache control request.

Hereinafter, the sequences of cache lock processing, cache flush processing, and cache preload processing are described in detail.

Figure 7:
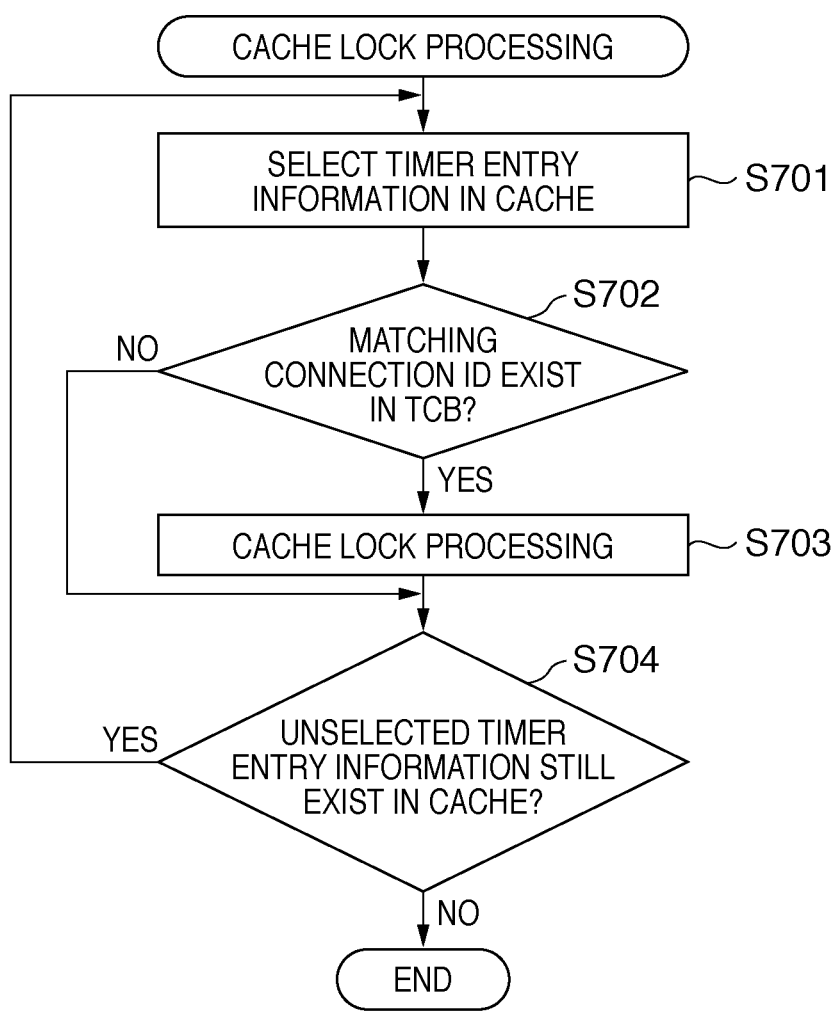
FIG. 7 is a flowchart describing cache lock processing according to the embodiment of the present invention.

FIG. 7 is a flowchart describing cache lock processing, which is one of the cache control performed by the network timer management controller 104. In step S701, the timer information management controller 205 selects one timer entry information in the cache memory 203. In step S702, the timer information management controller 205 determines, based on a connection ID of the timer entry information, whether or not a corresponding connection exists in the TCB. As a result of the determination, if a connection exists, the control proceeds from step S702 to S703. In step S703, the timer information management controller 205 locks the cache entry storing the corresponding timer entry information. The locked cache entry is excluded from the flush target. In other words, the cache entry which has been locked by the cache lock processing is prohibited from being flushed.

When it is determined in step S702 that connection information does not exist in the TCB, or when cache locking is performed in step S703, the control proceeds to step S704. In step S704, the timer information management controller 205 determines whether or not there is unselected timer entry information in the cache memory 203. If it is determined that unselected timer entry information exists, the control returns from step S704 to S701 to perform the above-described processing on the unselected timer entry information. If it is determined in step S704 that there is no unselected timer entry information in the cache memory 203, the cache lock processing ends. As described above, the network timer management controller 104 determines whether or not there is a TCB (connection information regarding a currently established connection) corresponding to the timer entry information cached in the cache memory 203. When there is a corresponding TCB, the network timer management controller 104 brings the timer entry information to a locked state in which the information is prohibited from being flushed from the cache memory 203. In this embodiment, it is determined in step S702 whether or not the connection ID of the timer entry information which is extracted from the cache memory 203 exists in the TCB. However, it may also be possible to determine whether or not the timer entry information having the connection ID which is extracted from the TCB exists in the cache memory 203. If the timer entry information is found in the cache memory 203, the timer entry information in the cache memory 203 is locked.

Figure 8:
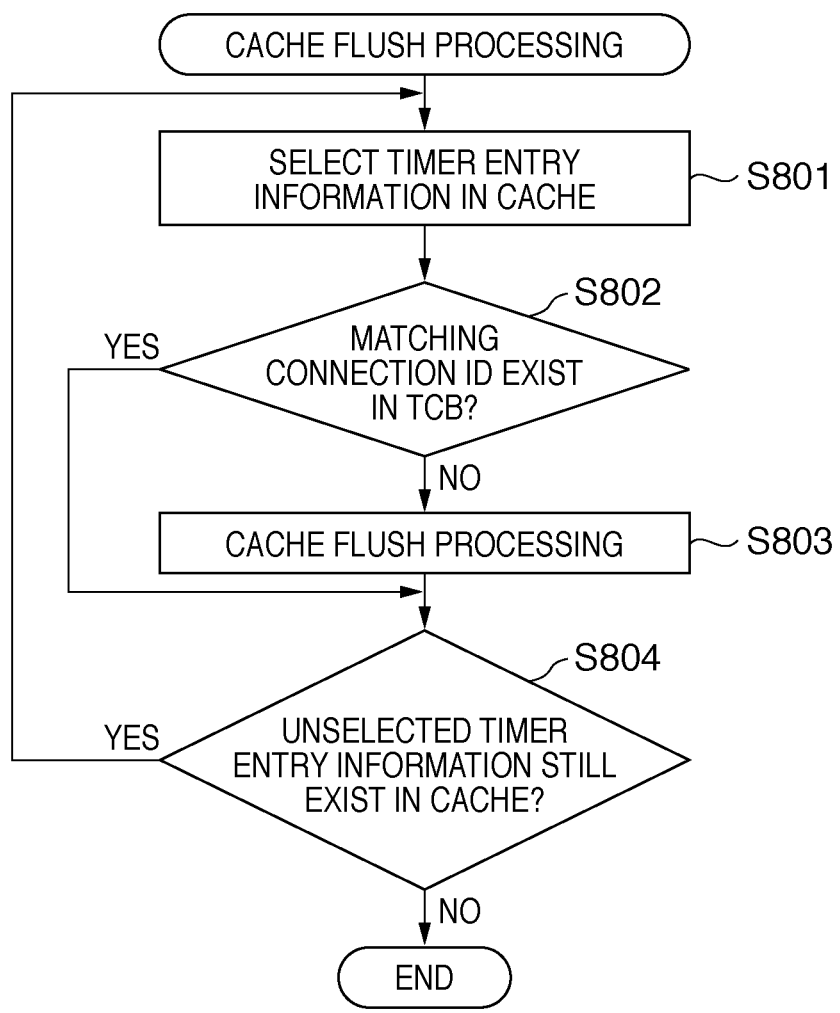
FIG. 8 is a flowchart describing cache flush processing according to the embodiment of the present invention.

FIG. 8 is a flowchart describing cache flush processing, which is one of the cache control performed by the network timer management controller 104. In step S801, the timer information management controller 205 selects one timer entry information in the cache memory 203. In step S802, the timer information management controller 205 determines, based on a connection ID of the timer entry information, whether or not a corresponding connection exists in the TCB. If it is determined that a connection does not exist, the control proceeds to step S803. In step S803, the timer information management controller 205 flushes the timer entry information from the cache memory 203 (write it back in the RAM 103). In this stage, if the target cache entry is locked by the aforementioned cache lock processing described in FIG. 7, the cache lock is released and the timer entry information is flushed. In this manner, the network timer management controller 104 determines whether or not there is a TCB (connection information regarding a currently established connection) which is corresponding to the timer entry information cached in the cache memory 203. If a corresponding TCB does not exist, the network timer management controller 104 flushes the timer entry information from the cache memory 203.

When it is determined in step S802 that there is connection information corresponding to the timer entry information in the TCB, or when cache flushing is performed in step S803, the control proceeds to step S804. In step S804, the timer information management controller 205 determines whether or not there is unselected timer entry information in the cache memory 203. If it is determined that unselected timer entry information exists, the control returns to step S801 to repeat the above-described processing on the unselected timer entry information. If it is determined in step S804 that there is no unselected timer entry information in the cache memory 203, the cache flush processing ends. Note that, instead of performing cache lock processing in step S602, cache lock processing may be performed when it is determined in step S802 that there is connection information corresponding to the timer entry information in the TCB.

Figure 9:
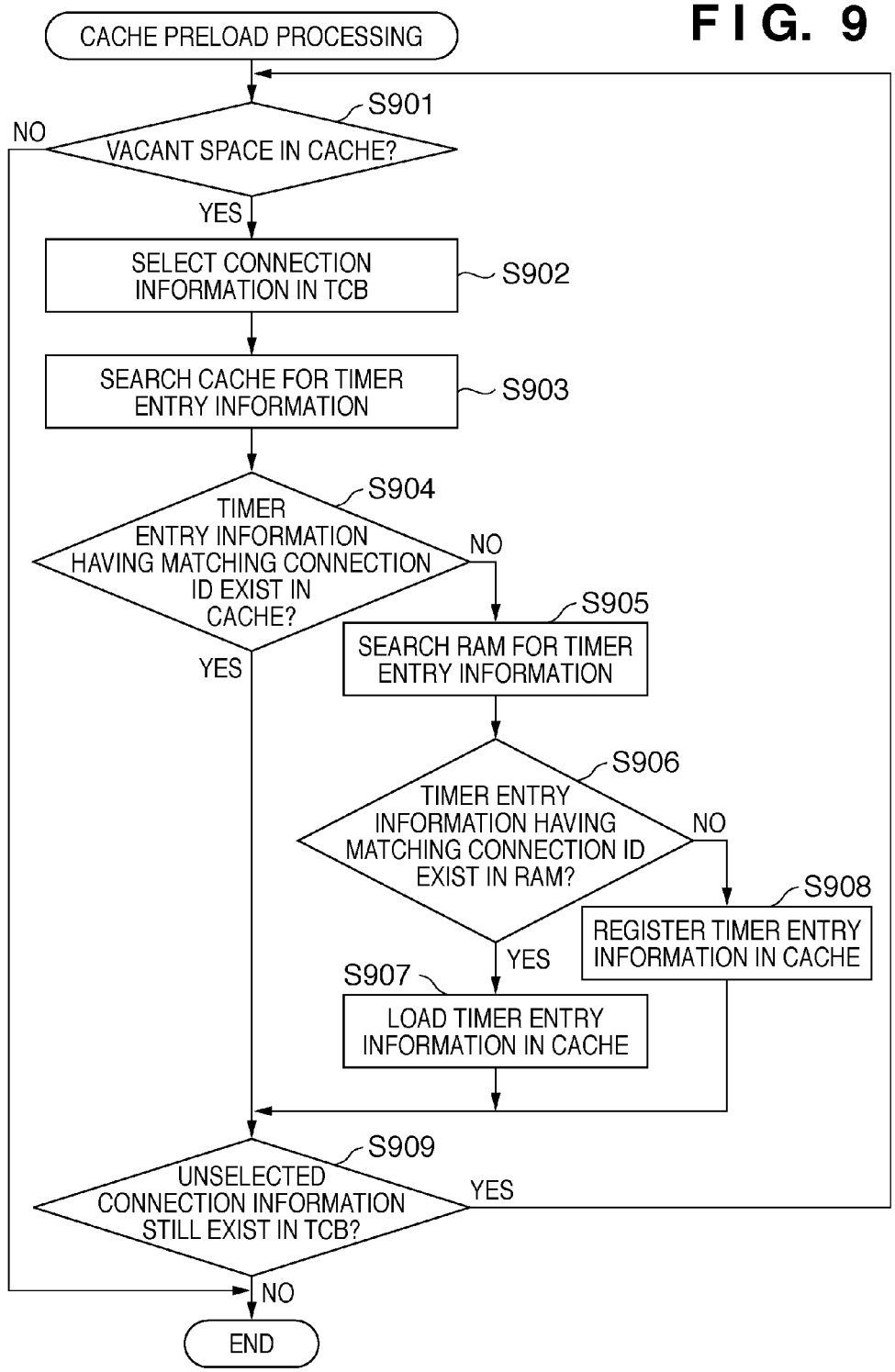
FIG. 9 is a flowchart describing cache preload processing according to the embodiment of the present invention.

FIG. 9 is a flowchart describing cache preload processing, which is one of the cache control performed by the network timer management controller 104. In step S901, the timer information management controller 205 determines whether or not there is vacant space in the cache memory 203. If it is determined that there is vacant space, the timer information management controller 205 selects one connection information in the TCB in step S902. In step S903, the timer information management controller 205 searches the cache memory 203 for timer entry information related to this connection information. As a result of the search, if it is determined in step S904 that there is timer entry information, no processing is performed. Note that the cache lock processing may be performed here instead of step S602 in FIG. 6.

Meanwhile, if it is determined in step S904 that there is no timer entry information related to the connection information, the timer information management controller 205 searches the RAM 103 for the corresponding timer entry information in step S905. If it is determined that there is corresponding timer entry information, the timer information management controller 205 loads the timer entry information in the cache memory 203 in step S907. If it is determined that there is no corresponding timer entry information, the timer information management controller 205 newly registers the timer entry information in the cache memory 203 in step S908.

In any of the following cases, the control proceeds to step S909:
in a case where the target timer entry information has already been registered in the cache memory 203 in step S904;
in a case where the target timer entry information is loaded in the cache in step S907; and
in a case where the target timer entry information is newly registered in the cache memory 203 in step S908.

In step S909, the timer information management controller 205 determines whether or not there is unselected connection information in the TCB of the RAM 103. If it is determined that unselected connection information exists, the control returns to step S901 to repeat the above-described processing on the unselected connection information. When it is determined in step S909 that there is no unselected connection information in the TCB, or when it is determined in step S901 that there is no vacant space in the cache memory 203, cache preload processing ends.

According to the network timer management controller of the above-described embodiment, connection information (TCB) regarding a connection currently established in the network communication is referred. A TCB is information which is generated when a connection is established, and deleted when the connection is cut off. Based on the connection information, timer information caching in the cache memory 203 is controlled. Therefore, it is possible to realize cache control which is suitable for the network timer management and improve re-usability of the cache.

Note the cache preload processing may be configured in a way that the timer entry information related to an active connection is preferentially cached among the connection information of the TCB. This can improve internal usage efficiency of the cache with regard to timer entry information of the network timer. The improved cache usage efficiency means a reduced number of times of access to the RAM 103; and therefore, it is possible to expect a reduced access load on the bus and reduced power consumption.

Note, in the present embodiment, cache locking is performed on the timer entry information related to a connection which is included in the TCB. However, if the control is configured so as to perform cache flushing only during the cache flush sequence shown in FIG. 8, it is possible to omit cache lock processing because cache flushing is executed after the confirmation of whether or not the timer entry information is included in the TCB. By virtue of this, it is possible to reduce a processing load corresponding to the cache lock processing. Therefore, it is possible to expect a reduced load of implementation, improved processing speed, reduced power consumption and the like.

Furthermore, in the above embodiment, although the cache flushing is performed on the timer entry information related to a connection which is not included in the TCB, the present embodiment is not limited to this. For instance, the cache lock processing in FIG. 7 may be configured in a way that, in a case where the control proceeds to NO in step S702, the cache lock of the timer entry information having the target connection ID is released. Then, in cache flush processing in FIG. 8, the control may be configured to confirm whether or not the timer entry information is cache-locked in step S802, and to perform cache flushing only on the timer entry information which is not cache-locked. Accordingly, cache flush processing can be proceeded regardless of the content of the TCB. Therefore, cache flush processing can be performed, for instance, at every predetermined cycle or at the timing of adding timer entry information in the cache. By virtue of this, it is possible to expect further improvement in cache usage efficiency.

Further, although the present embodiment does not clearly state the type of timer to be preloaded in the cache preload processing, timer entry information of a particular type of timer may selectively be preloaded. For instance, in TCP/IP processing, there are timers which are frequently used or less frequently used, and timers which have a long time-out cycle or a short time-out cycle. Therefore, the embodiment may be configured in a way that processing is performed first from the type of timer having a higher priority by setting priority levels on each type of timers, or that timer entry information is prepared only for the type of timer having a high priority level. By virtue of this, timer entry information of a frequently used timer and timer entry information of a timer having a short time-out cycle, which are not targeted to preloading in a case where there is no vacant space in the cache in the above-described embodiment, can easily be preloaded to the cache. Accordingly, it is possible to further improve cache usage efficiency and expect positive effects, such as improved processing speed, a reduced load on the bus when accessing the RAM 103, reduced power consumption, and the like.

Furthermore, in the aforementioned embodiment, the cache lock processing and cache flush processing are performed based on whether or not there is a corresponding connection in the TCB, regardless of the type of timer. However, similar to the above, the control may be configured so that the cache lock processing is executed only on the type of timer having a high priority level. It is also possible, or it is alternatively possible to configure the control in a way that cache flushing is performed on the type of timer having a low priority level, even if the timer is related to the connection information included in the TCB. By virtue of this configuration, it is possible to further improve cache usage efficiency and expect positive effects, such as improved processing speed, a reduced load on the bus when accessing the RAM 103, reduced power consumption, and the like.

Similarly, in the aforementioned embodiment, in timer start processing, although timer entry information is stored in the cache regardless of the type of timer in a case where there is vacant space in the cache, the present invention is not limited to this. For instance, the control may be configured in a way that caching is allowed only for the type of timer having a high priority level. By virtue of this configuration, it is possible to further improve cache usage efficiency and expect positive effects, such as improved processing speed, a reduced load on the bus when accessing the DRAM, reduced power consumption, and the like.

Furthermore, in the aforementioned embodiment although processing is performed based only on the TCB which has been loaded in the cache control processing, another embodiment of the present invention may be configured in a way that a previously loaded TCB is saved so as to enable comparison. By virtue of this configuration, it is possible to easily detect newly added connection information and deleted connection information. Furthermore, by subjecting the detected connection information to cache lock processing, cache flush processing, and cache preload processing, it is possible to realize these processing at high speed.

Moreover, although the above embodiment has not mentioned about deleting the timer entry information registered in the RAM 103 or cache memory 203, deletion may be executed at predetermined timing and conditions. By deleting timer entry information from the RAM 103, it is not only possible to reduce an occupied area of the RAM 103, but also possible to expect various effects. For instance, if the control is constructed to delete from the cache memory 203 the timer entry information related to the connection information which is deleted from the TCB, the process of accessing the RAM 103 (writing back the timer entry information) in cache flush processing is no longer necessary. As a result, it is possible to expect improved processing speed, a reduced load on the bus when accessing the RAM 103, reduced power consumption, and the like.

Furthermore, in the present embodiment, although whether or not time-out has occurred is confirmed with respect to all activated timers (timers in which an active flag is set) at the count-up timing of the free run timer, the present invention is not limited to this. For instance, for a timer which has a long time-out cycle, time-out may be confirmed at a longer cycle (e.g., every predetermined number of times of count-ups of the free run counter). By virtue of this configuration, it is possible to suppress the number of accesses to the RAM 103 at every count-up of the free run counter, and can expect effects such as improved processing speed, a reduced load on the bus when accessing the RAM 103, reduced power consumption, and the like.

As described above, according to the present embodiment, in a network timer management apparatus incorporating a cache, cache control is performed based on a connection status in a network communication. Therefore, it is possible to improve reusability of the cache and prevent performance degradation caused by competition between the shared memory and the system bus. Furthermore, a usage rate of the shared memory and system bus can be reduced and power consumption can be cut back.

Furthermore, according to the timer start request processing and cache preload processing of the above-described embodiment, in accordance with an addition of a new connection which is realized with reference to a TCB (connection information), the connection information is cached. Therefore, when timer control is performed using the cache memory, it is possible to improve a cache hit rate.

Still further, according to the flush processing of the above-described embodiment, a cache occupying rate of the timer entry information related to an existing closed connection is held down. Therefore, it is possible to efficiently use the cache when timer control is performed with regard to other connections.

Still further, according to the cache lock processing of the above-described embodiment, time-out information related to an established connection is restrained from being flushed from the cache. Therefore, it is possible to improve a cache hit rate when timer control is performed with regard to the connection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-327991, filed Dec. 19, 2007, which is hereby incorporated by reference herein in its entirety.

What is claimed is:

1. A communication apparatus comprising:
 a communication unit configured to establish a first communication connection with another communication apparatus and a second communication connection with the other communication apparatus, the first communication connection being different than the second communication connection;

a memory for storing:
- (i) first connection data associated with the first communication connection established by said communication unit,
- (ii) second connection data associated with the second communication connection established by said communication unit, and
- (iii) first timer information corresponding to the first connection data;

a cache, which is different from said memory, for storing second timer information corresponding to the second connection data that is stored in said memory, wherein the second timer information corresponding to the second connection data is different than the first timer information corresponding to the first connection data, and is stored in said cache without storing the first timer information in said cache;

a deletion unit configured to, in response to the communication unit disconnecting the second communication connection:
- delete the second connection data stored in said memory, and
- delete the second timer information stored in said cache; and a controller configured to:
- (a) determine whether said cache has vacant space as a result of the deletion of the second timer information by said deletion unit,
- (b) select whether to load the first timer information corresponding to the first connection data from said memory into said cache in accordance with a priority level set in the first timer information,
- (c) if it is determined that said cache has vacant space as a result of the deletion of the second timer information by said deletion unit and the first timer information is selected to be loaded from said memory into said cache, load the first timer information from said memory into said cache, and
- (d) notify said communication unit of a time-out of timer information stored in said cache and a time-out of timer information stored in said memory, wherein the communication apparatus further comprises a processor configured to function as said units.

2. The apparatus according to claim 1, wherein said communication unit operates in accordance with a TCP/IP protocol.

3. The apparatus according to claim 1, wherein said deletion unit deletes the first timer information which has been loaded into said cache from said memory in a case where the first communication connection is disconnected.

4. A timer control apparatus for controlling a cache in which timer information is stored, comprising:

a memory for storing
- (i) a plurality of connection data associated with a plurality of communication connections that have been currently established, respectively, and
- (ii) timer information corresponding to the plurality of connection data;

a cache, which is different from said memory, for storing timer information corresponding to a subset of the plurality of connection data stored in said memory;

a controller configured to:
- (a) determine whether said cache has vacant space,
- (b) select whether to load first timer information stored in said memory, the first timer information being different from the timer information corresponding to a subset of the plurality of connection data already stored in the cache, from said memory into said cache in accordance with a priority level set in the first timer information, and
- (c) if it is determined that the cache has vacant space and the first timer information is selected to be loaded from said memory into said cache, load the first timer information from said memory into said cache; and a notification unit configured to notify an external controller of a time-out of timer information stored in said cache and a time-out of timer information stored in said memory, wherein the timer control apparatus further comprises a processor configured to function as the controller and the notification unit.

5. The apparatus according to claim 4, wherein said controller discards timer information from said cache in a case where a communication connection is disconnected.

6. The apparatus according to claim 4, wherein said controller selects whether to store timer information in said memory or in said cache in accordance with a status of said cache.

7. A timer control method of controlling a cache in which timer information is stored, comprising the steps of:

storing in a memory:
- (i) a plurality of connection data associated with a plurality of communication connections that have been currently established, respectively, and
- (ii) timer information corresponding to the plurality of connection data;

storing, in a cache, which is different from the memory, timer information corresponding to a subset of the plurality of connection data stored in the memory;

determining whether the cache has vacant space;

selecting whether to load first timer information stored in the memory, the first timer information being different from the timer information corresponding to a subset of the plurality of connection data already stored in the cache, from the memory into the cache in accordance with a priority level set in the first timer information;

loading, if it is determined that the cache has vacant space and the first timer information is selected to be loaded from said memory into said cache, the first timer information from the memory into the cache; and notifying an external controller of a time-out of timer information stored in the cache and a time-out of timer information stored in the memory.

8. The method according to claim 7, further comprising a step of discarding timer information from the cache, in a case where a communication connection is disconnected.

9. The method according to claim 7, further comprising a step of selecting whether to store timer information in the memory or in the cache in accordance with a status of the cache.

10. A communication method for a communication apparatus, the method comprising:

a communication step of establishing a first communication connection with another communication apparatus and a second communication connection with the other communication apparatus, the first communication connection being different than the second communication connection;

a first storing step of storing in a memory:
- (i) first connection data associated with the first communication connection established in said communication step, (ii) second connection data associated with the second communication connection established in said communication step, and (iii) first timer information corresponding to the first connection data;

a second storing step of storing in a cache, which is different from the memory, second timer information corresponding to the second connection data stored in the memory, wherein the second timer information corresponding to the second connection data is different from the first timer information stored in the memory and is stored in the cache without storing the first timer information in the cache;

a deletion step of, in response to the second communication connection being disconnected:
   deleting the second connection data stored in the memory, and
   deleting the second timer information stored in the cache; and a controlling step of:
   (a) determining whether the cache has vacant space as a result of the deletion of the second timer information in said deletion step,
   (b) selecting whether to load the first timer information corresponding to the first connection data from the memory into the cache in accordance with a priority level set in the first timer information,
   (c) if it is determined that the cache has vacant space and the first timer information is selected to be loaded from the memory into the cache, loading the first timer information from the memory into the cache, and
   (d) sending notification of a time-out of timer information stored in the cache and a time-out of timer information stored in the memory.

11. A communication apparatus comprising:
a first control unit configured to establish a connection for communicating with an external apparatus;
a cache for caching timer information;
a memory for storing first timer information associated with the connection that has been currently established by said first control unit;
a second control unit configured to:
   (a) determine whether said cache has vacant space,
   (b) select whether to load the first timer information associated with the connection that has been currently established by said first control unit from said memory into said cache in accordance with a priority level set in the first timer information, and
   (c) if it is determined that said cache has vacant space, no timer information associated with the connection established by said first control unit is stored in said cache, and the first timer information stored in said memory is selected to be loaded from said memory into said cache, load the first timer information from said memory into said cache; and
a notification unit for notifying said first control unit of a time-out of timer information stored in said cache and a time-out of timer information stored in said memory,
wherein the communication apparatus further comprises a processor configured to function as said units.

12. The apparatus according to claim 11, wherein said second control unit discards from said cache timer information associated with a connection that is not being established.

13. The apparatus according to claim 11, wherein said second control unit determines whether to store timer information in said memory or in said cache, in accordance with a status of said cache.

14. The apparatus according to claim 11, wherein
priority has been set for each type of timer, and
said second control unit determines whether to store timer information associated with a connection in said memory or in said cache in accordance with a priority set to a type of timer indicated by the timer information.

15. The apparatus according to claim 11, wherein said first control unit performs a communication process in accordance with a TCP/IP protocol.

16. A timer management apparatus for managing a cache storing timer information, said apparatus comprising:
a control unit configured to store into an external memory first timer information associated with a connection that has been currently established;
a loading unit configured to:
   (a) determine whether the cache has vacant space,
   (b) select whether to load the first timer information stored in the external memory from the external memory into the cache in accordance with a priority level set in the first timer information, and
   (c) if it is determined that the cache has vacant space, no timer information associated with the connection that has been currently established is stored in the cache, and the first timer information is selected to be loaded from the external memory into the cache, load the first timer information from the external memory into the cache; and
a notification unit for notifying an external apparatus of a time-out of timer information stored in the cache and a time-out of timer information stored in the memory,
wherein the timer management apparatus further comprises a processor configured to function as said units.

17. The apparatus according to claim 16, further comprising a discarding unit configured to discard timer information stored in the cache, which is associated with a connection that is not established.

18. The apparatus according to claim 16, wherein said control unit determines whether to store timer information associated with a connection in the external memory or in the cache, in accordance with a status of the cache.

19. The apparatus according to claim 16, wherein
a priority has been set for each type of timer, and
said control unit determines whether to store timer information associated with a connection in the external memory or in the cache in accordance with a priority set to a type of timer indicated by the timer information.

20. A control method for a communication apparatus comprising a cache for caching timer information for communication control and a memory for storing timer information for communication control, said method comprising:
a first control step of establishing a connection for communicating with an external apparatus;
a second control step of storing first timer information associated with the connection that has been currently established in said first control step in the memory;
a loading step of:
   (a) determining whether the cache has vacant space,
   (b) selecting whether to load the first timer information stored in the memory from the memory into the cache in accordance with a priority level set in the first timer information, and
   (c) if it is determined that the cache has vacant space, no timer information associated with the connection established in said first control step is stored in the cache, and the first timer information is selected to be loaded from the memory into the cache, loading the first timer information from the memory into the cache; and
a notifying step of notifying an external controller of a time-out of timer information stored in the cache and a time-out of timer information stored in the memory.

21. A method of controlling a timer management apparatus for managing a cache storing timer information, said method comprising:
a control step of storing into an external memory first timer information associated with a connection that has been currently established;
a loading step of:
(a) determining whether the cache has vacant space,
(b) selecting whether to load the first timer information stored in the external memory from the external memory into the cache in accordance with a priority level set in the first timer information, and
(c) if it is determined that the cache has vacant space, no timer information associated with the connection that has been currently established is stored in the cache, and the first timer information is selected to be loaded from the external memory into the cache, loading the first timer information from the external memory into the cache; and
a notifying step of notifying an external apparatus of a time-out of timer information stored in the cache and a time-out of timer information stored in the memory.

22. A non-transitory computer-readable medium storing an executable computer program for causing a computer of a communication apparatus comprising a cache for caching timer information for communication control and a memory for storing timer information for communication control, to function as:
a first control unit configured to establish a connection for communicating with an external apparatus;
a second control unit configured to store first timer information associated with the connection that has been currently established by said first control unit in the memory;
a loading unit configured to:
(a) determine whether the cache has vacant space,
(b) select whether to load the first timer information stored in the memory from the memory into the cache in accordance with a priority level set in the first timer information, and
(c) if it is determined that the cache has vacant space, no timer information associated with the connection established by said first control unit is stored in the cache, and the first timer information is selected to be loaded from the memory into the cache, load the first timer information from the memory into the cache; and
a notification unit configured to notify the first control unit of a time-out of timer information stored in the cache and a time-out of timer information stored in the memory.

23. A non-transitory computer-readable medium storing an executable computer program for causing a computer of a timer management apparatus for managing a cache storing timer information to function as:
a control unit configured to store into an external memory first timer information associated with a connection that has been currently established;
a loading unit configured to:
(a) determine whether the cache has vacant space,
(b) select whether to load the first timer information stored in the external memory from the external memory into the cache in accordance with a priority level set in the first timer information, and
(c) if it is determined that the cache has vacant space, no timer information associated with the connection that has been currently established is stored in the cache, and the first timer information is selected to be loaded from the external memory into the cache, load the first timer information from the external memory into the cache; and
a notification unit configured to notify the first control unit of a time-out of timer information stored in the cache and a time-out of timer information stored in the memory.

* * * * *